United States Patent
Black et al.

(10) Patent No.: US 7,480,347 B2
(45) Date of Patent: Jan. 20, 2009

(54) ANALOG FRONT-END HAVING BUILT-IN EQUALIZATION AND APPLICATIONS THEREOF

(75) Inventors: William C. Black, Ames, IA (US);
Charles W. Boecker, Ames, IA (US);
Eric D. Groen, Ankeny, IA (US)

(73) Assignee: Xilinx, Inc., San Jose, CA (US)

( * ) Notice: Subject to any disclaimer, the term of this patent is extended or adjusted under 35 U.S.C. 154(b) by 1125 days.

(21) Appl. No.: 10/659,803

(22) Filed: Sep. 11, 2003

(65) Prior Publication Data

US 2005/0058222 A1 Mar. 17, 2005

(51) Int. Cl.
*H03K 9/00* (2006.01)
*H04L 27/00* (2006.01)
(52) U.S. Cl. .................. 375/316; 375/147; 375/229; 375/232; 375/233
(58) Field of Classification Search .................. 375/316, 375/147, 229, 232, 233
See application file for complete search history.

(56) References Cited

U.S. PATENT DOCUMENTS 6,188,721 B1 * 2/2001 Shirani et al. ............... 375/232
6,240,131 B1    5/2001 Cheng et al.
6,492,876 B1   12/2002 Kamal et al.
6,531,931 B1    3/2003 Benyamin et al.
6,545,622 B1    4/2003 Kamal et al.

\* cited by examiner

*Primary Examiner*—Ted Wang
(74) *Attorney, Agent, or Firm*—Timothy W. Markison; Michael R. Hardaway

(57) ABSTRACT

An analog front-end having built-in equalization includes a control module and a tunable gain stage. The control module is operably coupled to provide a frequency response setting based on a channel response of a channel providing high-speed serial data to the analog front-end. The tunable gain stage includes a frequency dependent load and an amplifier input section. The frequency dependent load is adjusted based on the frequency response setting. The amplifier input section is operably coupled to the frequency dependent load and receives the high-speed serial data. In conjunction with the frequency dependent load, the amplifier input section amplifies and equalizes the high-speed serial data to produce an amplified and equalized serial data.

12 Claims, 8 Drawing Sheets programmable logic device 10 programmable MGT 14 - 28 programmable receive PMA module 40 programmable front-end 100 programmable front-end 100 tunable gain stage 108 tunable gain stage 108 tunable gain stage 108

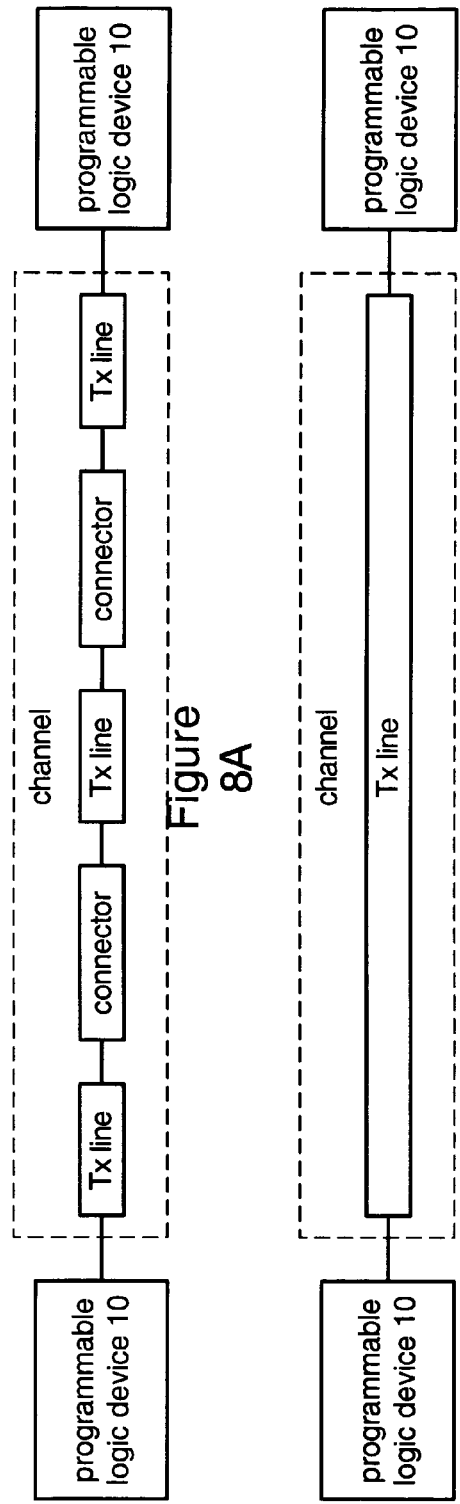
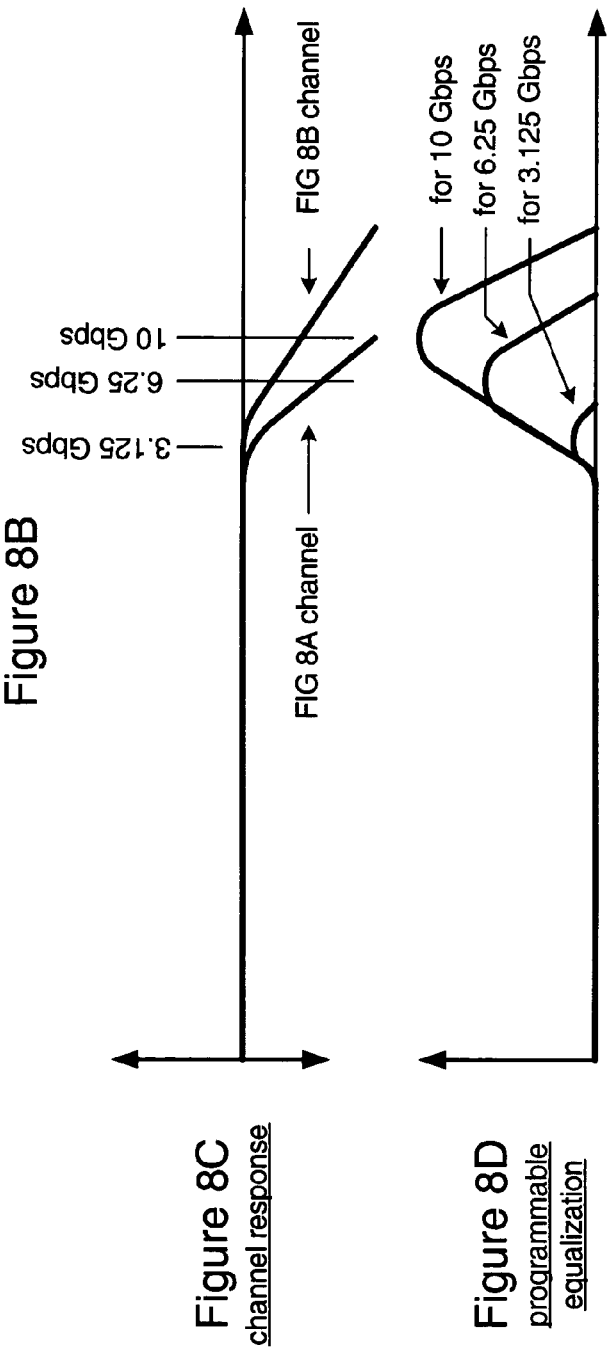
Figure 8A
Figure 8B
Figure 8C
channel response
Figure 8D
programmable equalization

ANALOG FRONT-END HAVING BUILT-IN EQUALIZATION AND APPLICATIONS THEREOF

BACKGROUND OF THE INVENTION

1. Technical Field

This invention relates generally to communication systems and more particularly to an enhanced data conveyance within such communication systems.

2. Description of Related Art

Communication systems are known to transport large amounts of data between a plurality of end user devices. Such end user devices include telephones, facsimile machines, computers, television sets, cellular phones, personal digital assistants, et cetera. As is also known, such communication systems may be a local area network (LAN) and/or a wide area network (WAN). A local area network is generally understood to be a network that interconnects a plurality of end user devices distributed over a localized area (e.g., up to a radius of 10 kilometers) and includes LAN infrastructure equipment. For example, a local area network may be used to interconnect workstations distributed within an office of a single building or a group of buildings, to interconnect computer based equipment distributed around a factory or hospital, et cetera. As is further known, local area networks may be wired local area networks or wireless local area networks. Wired local area networks typically have a star topology, ring topology, bus topology or hub/tree topology.

A wide area network is generally understood to be a network that covers a wide geographic area and includes WAN infrastructure equipment. Wide area networks include both public data networks and enterprise wide private data networks. A public data network is established and operated by a national network administrator specifically for data transmission. Such public data networks facilitate the inner working of equipment from different manufacturers. Accordingly, standardizations by the ITU-T have been established for conveying data within public data networks. Currently, there are two main types of public data networks: packet switched public data networks and circuit switched public data networks. For example, the public switched telephone network is a circuit switched public data network while the Internet is a packet switched public data network. Other examples of wide area networks include integrated service digital networks (ISDN) and broadband multiservice networks.

As is further known, communication systems may be networked together to yield larger communication systems, where such networking is typically referred to as internetworking. Internetworking is achieved via internetworking units that allow communication networks using the same or different protocols to be linked together. The internetworking units may be routers, gateways, protocol converters, bridges, and/or switches.

Regardless of the type of communication system (e.g., LAN, WAN, or internetworking system), each communication system employs a data conveyance protocol to ensure that data is accurately conveyed within the system. In general, a protocol is a formal set of rules and conventions that govern how system devices (i.e., end user devices, LAN infrastructure equipment, WAN infrastructure equipment, and/or internetworking units) exchange data within the communication system. Such protocols typically include regulations on receiver sensitivity (i.e., how noisy a received signal may be and how small its amplitude may be) for signals received by a system device or within a system device and on transmit power of a signal from one system device to another or within the system device.

As is further known, each system device processes millions of bits of data per second. Accordingly, each system device includes high-speed data interfaces to efficiently input and output data. Such interfaces are typically implemented as integrated circuits that are mounted on a printed circuit board. A group of printed circuit boards may be mounted on a back plane and multiple back planes may further be placed in a rack to make up the system device.

In an effort to meet the ever-increasing challenges of improving data conveyance speed, each system device includes an increasing number of integrated circuits, printed circuit boards (PCBs), and/or racks. Typically, the racks and PCB's are coupled together using coaxial cables, fiber optics, connectors, and/or wires. The integrated circuits on a printed circuit board are operably coupled together via copper traces (e.g., FR4 connections). As the number and complexity of the system devices increases, along with the desired speed of conveying data therebetween, the distance between ICs, PCBs, and/or racks is increasing in diversity. Some communication channels between ICs, PCBs, and/or racks may be relatively short (i.e., have a channel response that introduces minimal distortion of the signals it carries) while others are relatively long (i.e., have a channel response that introduces significant distortion of the signals it carries).

Typically, a receiver section of a high-speed data interface includes an equalizer to compensate for the distortion produced as a result of the channel response. Typically, the equalizer is set to compensate for the channel response of a nominal channel. In other words, the equalizer is fixed to provide a nominal equalization response, which corresponds to the inverse of the nominal channel response. However, as the channel responses vary more and more due to the increasing diversity of channel lengths, a fixed equalizer is inadequate to meet the receiver sensitivity requirements of many standardized protocols.

Therefore, a need exists for programmable equalizer for use within receiver sections of high-speed data interfaces.

BRIEF SUMMARY OF THE INVENTION

The analog front-end having built-in equalization of the present invention substantially meets these needs and others. In one embodiment, an analog front-end having built-in equalization includes a control module and a tunable gain stage. The control module is operably coupled to provide a frequency response setting based on a channel response of a channel providing high-speed serial data to the analog front-end. The tunable gain stage includes a frequency dependent load and an amplifier input section. The frequency dependent load is adjusted based on the frequency response setting. The amplifier input section is operably coupled to the frequency dependent load and receives the high-speed serial data. In conjunction with the frequency dependent load, the amplifier input section amplifies and equalizes the high-speed serial data to produce an amplified and equalized serial data. As such, an analog front-end may have its built-in equalizer adjusted to compensate for the varying channel responses.

In another embodiment, an analog front-end having built-in equalization includes a frequency dependent load, and amplifier input section. The amplifier input section is operably coupled to the frequency dependent load and receives high-speed serial data. In conjunction with the frequency dependent load, the amplifier input section amplifies and equalizes the high-speed serial data to produce an amplified and equalized serial data.

Such an analog front-end having built-in equalization may be incorporated in a high-speed data receiver that receives high-speed serial data via a channel. The channel may be of varying lengths and as such have varying channel responses. Based on the channel response, the analog front-end is adjusted to provide an appropriate level of equalization.

BRIEF DESCRIPTION OF THE SEVERAL VIEWS OF THE DRAWINGS

FIGS. 8A-8D illustrate various channels, channel responses and programmable equalization in accordance with the present invention.

DETAILED DESCRIPTION OF THE INVENTION

Figure 1:
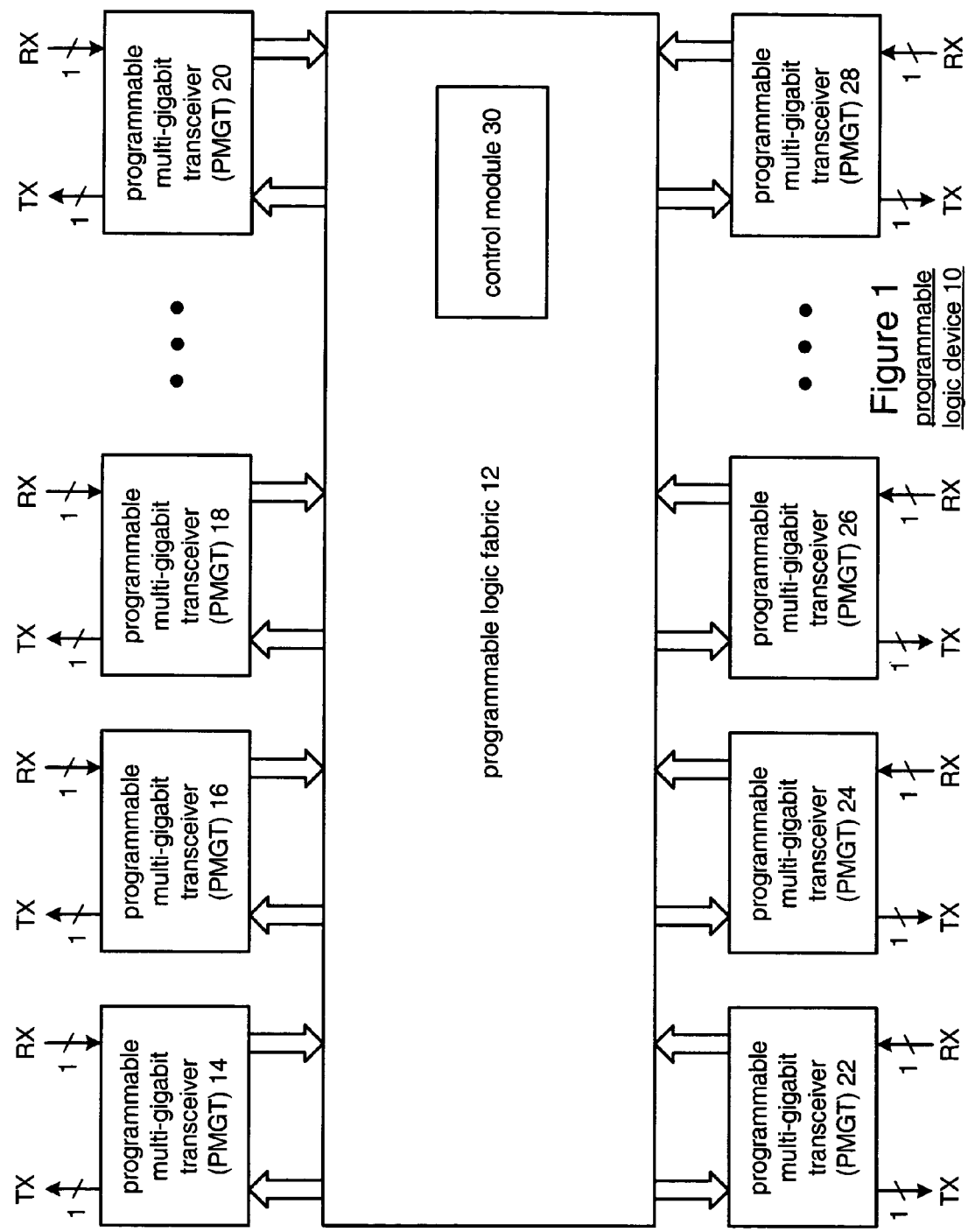
FIG. 1 is a schematic block diagram of a programmable logic device in accordance with the present invention.

FIG. 1 is a schematic block diagram of a programmable logic device 10 that includes programmable logic fabric 12, a plurality of programmable multi-gigabit transceivers (PMGT) 14-28 and a control module 30. The programmable logic device 10 may be a programmable logic array device, a programmable array logic device, an erasable programmable logic device, and/or a field programmable gate array (FPGA). When the programmable logic device 10 is a field programmable gate array (FPGA), the programmable logic fabric 12 may be implemented as a symmetric array configuration, a row-based configuration, a sea-of-gates configuration, and/or a hierarchical programmable logic device configuration. The programmable logic fabric 12 may further include at least one dedicated fixed processor, such as a microprocessor core, to further facilitate the programmable flexibility offered by a programmable logic device 10.

The control module 30 may be contained within the programmable logic fabric 12 or it may be a separate module. In either implementation, the control module 30 generates the control signals to program each of the transmit and receive sections of the programmable multi-gigabit transceivers 14-28. In general, each of the programmable multi-gigabit transceivers 14-28 performs a serial-to-parallel conversion on received data and performs a parallel-to-serial conversion on transmit data. The parallel data may be 8-bits, 16-bits, 32-bits, 64-bits, et cetera wide. Typically, the serial data will be a 1-bit stream of data that may be a binary level signal, multi-level signal, etc. Further, two or more programmable multi-gigabit transceivers may be bonded together to provide greater transmitting speeds. For example, if multi-gigabit transceivers 14, 16 and 18 are transceiving data at 3.125 gigabits-per-second, the transceivers 14-18 may be bonded together such that the effective serial rate is 3 times 3.125 gigabits-per-second.

Each of the programmable multi-gigabit transceivers 14-28 may be individually programmed to conform to separate standards. In addition, the transmit path and receive path of each multi-gigabit transceiver 14-28 may be separately programmed such that the transmit path of a transceiver is supporting one standard while the receive path of the same transceiver is supporting a different standard. Further, the serial rates of the transmit path and receive path may be programmed from 1 gigabit-per-second to tens of gigabits-per-second. The size of the parallel data in the transmit and receive sections, or paths, is also programmable and may vary from 8-bits, 16-bits, 32-bits, 64-bits, et cetera.

Figure 2:
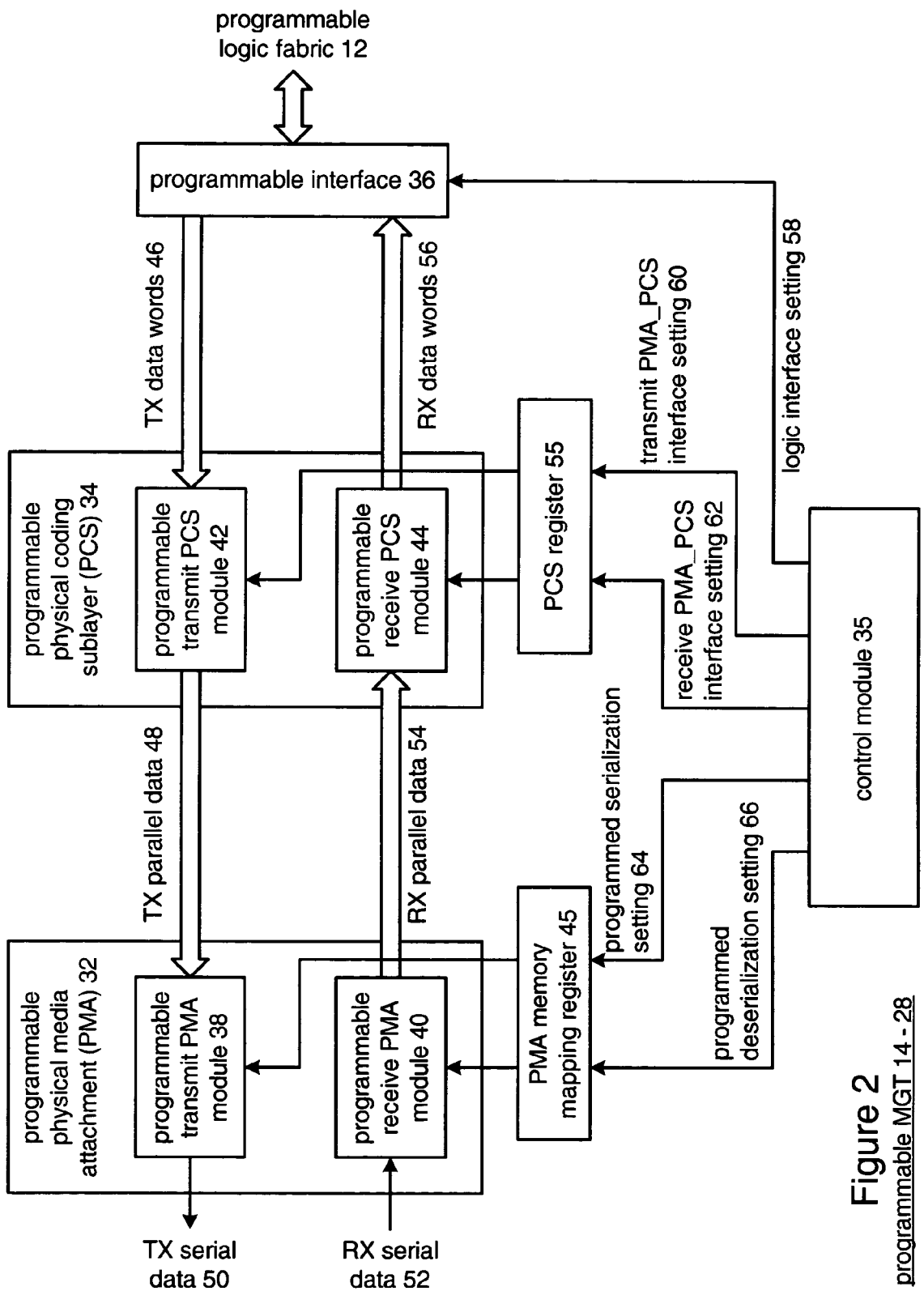
FIG. 2 is a schematic block diagram of a programmable multi-gigabit transceiver in accordance with the present invention.

FIG. 2 is a schematic block diagram of one embodiment of a representative one of the programmable multi-gigabit transceivers 14-28. As shown, the programmable multi-gigabit transceiver includes a programmable physical media attachment (PMA) module 32, a programmable physical coding sub-layer (PCS) module 34, a programmable interface 36, a control module 35, a PMA memory mapping register 45 and a PCS register 56. The control module 35, based on the desired mode of operation for the individual programmable multi-gigabit transceiver 14-28, generates a programmed deserialization setting 66, a programmed serialization setting 64, a receive PMA_PCS interface setting 62, a transmit PMA_PCS interface setting 60, and a logic interface setting 58. The control module 35 may be a separate device within each of the multi-gigabit transceivers and/or included within the control module 30. In either embodiment of the PMGT control module 35, the programmable logic device control module 30 determines the corresponding overall desired operating conditions for the programmable logic device 10 and provides the corresponding operating parameters for a given multi-gigabit transceiver to its control module 35, which generates the settings 58-66.

Figure 3:
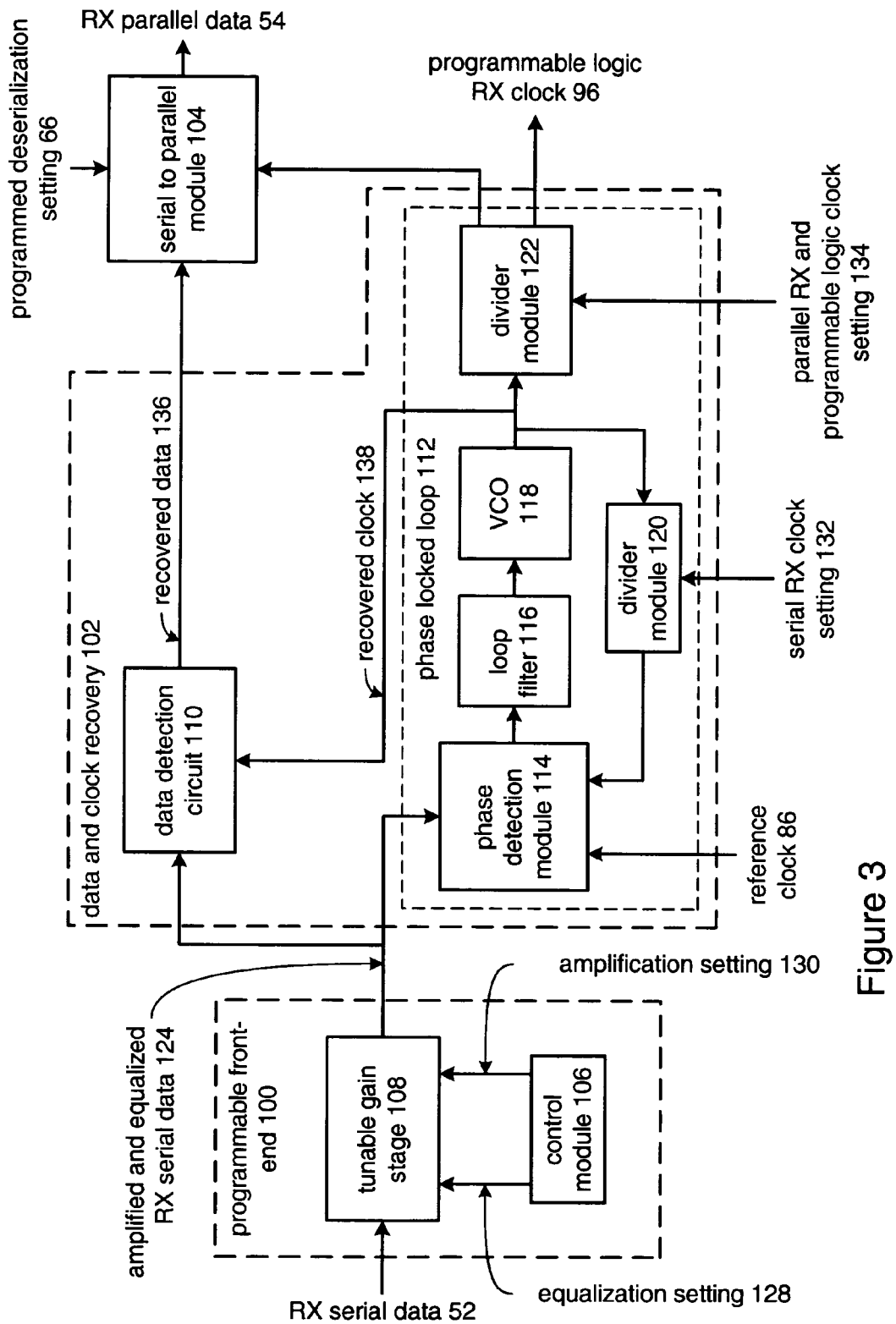
FIG. 3 is a schematic block diagram of a programmable receive physical media attachment (PMA) module in accordance with the present invention.

The programmable physical media attachment (PMA) module 32 includes a programmable transmit PMA module 38 and a programmable receive PMA module 40. The programmable transmit PMA module 38 is operably coupled to convert transmit parallel data 48 into transmit serial data 50 in accordance with the programmed serialization setting 64. The programmed serialization setting 64 indicates the desired rate of the transmit serial data 50, the desired rate of the transmit parallel data 48, and the data width of the transmit parallel data 48. The programmable receive PMA module 40, which will be described in greater detail with reference to FIG. 3, is operably coupled to convert receive serial data 52 into receive parallel data 54 based on the programmed deserialization setting 66. The programmed deserialization setting 66 indicates the rate of the receive serial data 52, the desired rate of the receive parallel data 54, and the data width of the receive parallel data 54. The PMA memory mapping register 45 may store the serialization setting 64 and the deserialization setting 66.

The programmable physical coding sub-layer (PCS) module 34 includes a programmable transmit PCS module 42 and a programmable receive PCS module 44. The programmable transmit PCS module 42 receives transmit data words 46 from the programmable logic fabric 12 via the programmable interface 36 and converts them into the transmit parallel data 48 in accordance with the transmit PMA_PCS interface setting 60. The transmit PMA_PCS interface setting 60 indicates the rate of the transmit data words 46, the size of the transmit data words (e.g., 1-byte, 2-bytes, 3-bytes, 4-bytes, et cetera) and the corresponding transmission rate of the transmit parallel data 48. The programmable receive PCS module 44 converts the received parallel data 54 into received data words 56 in accordance with the receive PMA_PCS interface setting 62. The received PMA_PCS interface setting 62 indicates the rate at which the received parallel data 54 will be received, the width of the parallel data 54, the transmit rate of the received data words 56 and the word size of the received data words 56.

The control module 35 also generates the logic interface setting 58 that provides the rates at which the transmit data words 46 and receive data words 56 will be transceived with the programmable logic fabric 12. Note that the transmit data words 46 may be received from the programmable logic fabric 12 at a different rate than the received data words 56 are provided to the programmable logic fabric 12.

As one of average skill in the art will appreciate, each of the modules within the PMA module 32 and PCS module 34 may be individually programmed to support a desired data transfer rate. The data transfer rate may be in accordance with a particular standard, such that the receive path, i.e., the programmable receive PMA module 40 and the programmable receive PCS module 44, may be programmed in accordance with one standard while the transmit path, i.e., the programmable transmit PCS module 42 and the programmable transmit PMA module 38, may be programmed in accordance with another standard.

FIG. 3 illustrates a schematic block diagram of the programmable receive PMA module 40 that includes a programmable front-end 100, a data and clock recovery module 102, and a serial-to-parallel module 104. The programmable front-end 100, which will be described in greater detail with reference to FIGS. 4-8D, includes a tunable gain stage 108 and control module 106. The data and clock recovery module 102 includes a data detection circuit 110 and a phase locked loop 112. The phase locked loop 112 includes a phase detection module 114, a loop filter 116, a voltage controlled oscillator 118, a $1^{st}$ divider module 120, and a $2^{nd}$ divider module 122.

The programmable front-end 100 is operably coupled to receive the receive serial data 52 and produce amplified and equalized receive serial data 124 therefrom. To achieve this, the tunable gain stage 108 is programmed in accordance with an equalization setting 128 and an amplification setting 130, as produced by the control module 106, to provide the appropriate equalization and amplification of the received serial data 52.

The data and clock recovery circuit 102 receives the amplified and equalized receive serial data 124 via the phase detection module 114 of phase locked loop 112 and via the data detection circuit 110. The phase detection module 114 has been initialized prior to receiving the amplified and equalized receive serial data 124 by comparing the phase and/or frequency of the reference clock 86 with a feedback reference clock produced by divider module 120. Based on this phase and/or frequency difference, the phase detection module 114 produces a corresponding current that is provided to loop filter 116. The loop filter 116 converts the current into a control voltage that adjusts the output frequency of the voltage controlled oscillator 118. The divider module 120, based on a serial received clock setting 132, divides the output oscillation produced by the VCO 118 to produce the feedback signal. Once the amplified and equalized receive serial data is received, the phase detection module 114 compares the phase of the amplified and equalized receive serial data 124 with the phase of the amplified and equalized receive serial data 124. Based on a phase difference between the amplified and equalized receive serial data 124 and the feedback signal, a current signal is produced.

The phase detection module 114 provides the current signal to the loop filter 116, which converts it into a control voltage that controls the output frequency of the voltage controlled oscillator 118. At this point, the output of the voltage controlled oscillator 118 corresponds to a recovered clock 138. The recovered clock 138 is provided to the divider module 122, the data detection circuit 110 and to the serial-to-parallel module 104. The data detection module 110 utilizes the recovered clock 138 to recovered data 136 from the amplified equalized receive serial data 124. The divider module 122 divides the recovered clock 138, in accordance with a parallel receive and programmable logic clock setting 134, to produce the parallel receive clock 94 and the programmable logic receive clock 96. Note that the serial receive clock setting 132 and the parallel receive and programmable logic clock setting 134 are part of the programmable deserialization setting 66 provided to the programmable receive PMA module 40 by the control module 35.

The serial-to-parallel module 104, which may include an elastic store buffer, receives the recovered data 136 at a serial rate in accordance with the recovered clock 138. Based on a serial-to-parallel setting 135 and the parallel receive clock 194, the serial-to-parallel module 104 outputs the receive parallel data 54. The serial-to-parallel setting 135, which may be part of the programmable deserialization setting 66, indicates the rate and data width of the receive parallel data 54.

Figure 4:
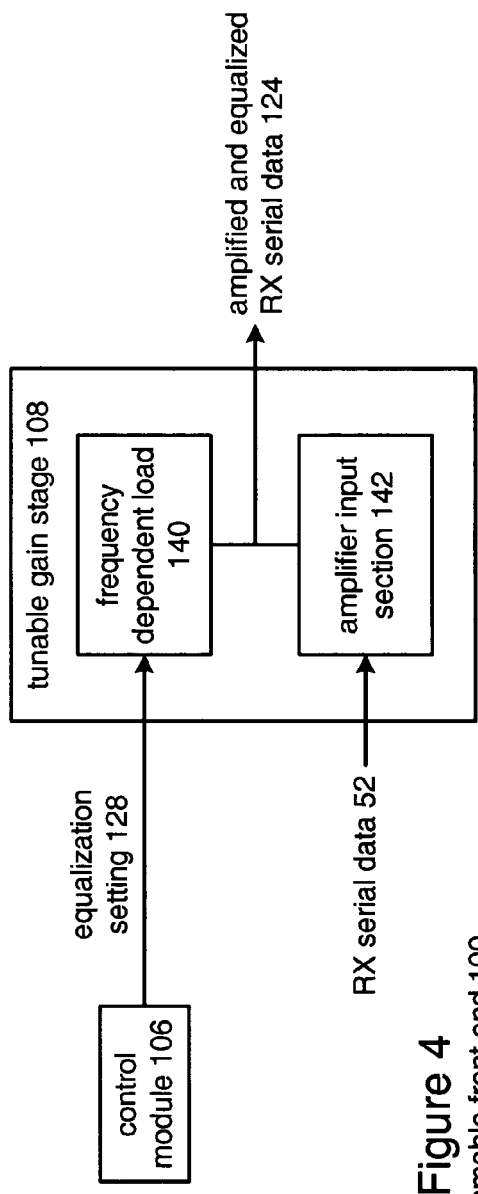
FIG. 4 is a schematic block diagram of a programmable front-end in accordance with the present invention.

FIG. 4 is a schematic block diagram of a programmable front-end 100 that includes control module 106 and a tunable gain stage 108. The tunable gain stage 108 includes a frequency dependent load 140 and an amplifier input section 142. The tunable gain stage 108 will be described in greater detail with reference to FIGS. 6 and 7.

The control module 106 generates an equalization setting 128 based on the channel response of the channel on which the receive serial data 52 is received. The control module 106 provides the equalization setting 128 to the frequency dependent load 140. The control module may also provide an amplification setting 130 to the tunable gain stage 108 based on the signal strength of the receive serial data 52.

The frequency dependent load 140, based on the equalization setting 128 and/or the amplification setting 130, adjusts its frequency response. The amplifier input section 142, in combination with the adjusted frequency dependent load 140, amplifies the received serial data 52 to produce amplified and equalized received serial data 124. In one embodiment, the frequency dependent load 140 includes at least one high-pass filter.

Figure 5:
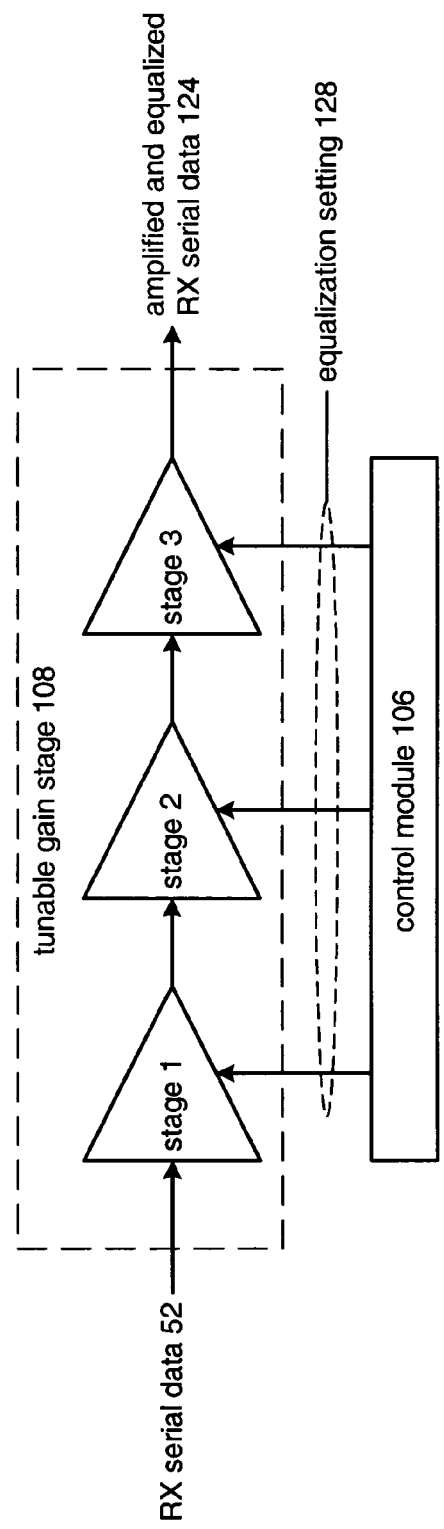
FIG. 5 is a schematic block diagram of an alternate embodiment of a programmable front-end in accordance with the present invention.

FIG. 5 is an alternate schematic block diagram of a programmable front-end 100 that includes a tunable gain stage 108 and control module 106. The tunable gain stage 108 includes 3 stages (stage 1, stage 2 and stage 3), which will be described in greater detail with reference to FIGS. 6-8D, that each receive the equalization setting 128 and/or amplification setting 130 from control module 106. As shown, stage 1 receives the received serial data 52, amplifies it, equalizes it, and passes its output to stage 2 which further amplifies and equalizes the signal which passes its output to stage 3 which further amplifies and equalizes the signal to produce the amplified and equalized received serial data 124. In this embodiment, stages 1 and 2 may be considered $1^{st}$ and $2^{nd}$ input stages while stage 3 may be considered an output stage of the tunable gain stage 108. As one of average skill in the art will appreciate, stages 1, 2 and 3 may be individually programmed via the control module 106 and/or programmed utilizing the same equalization setting.

Figure 6:
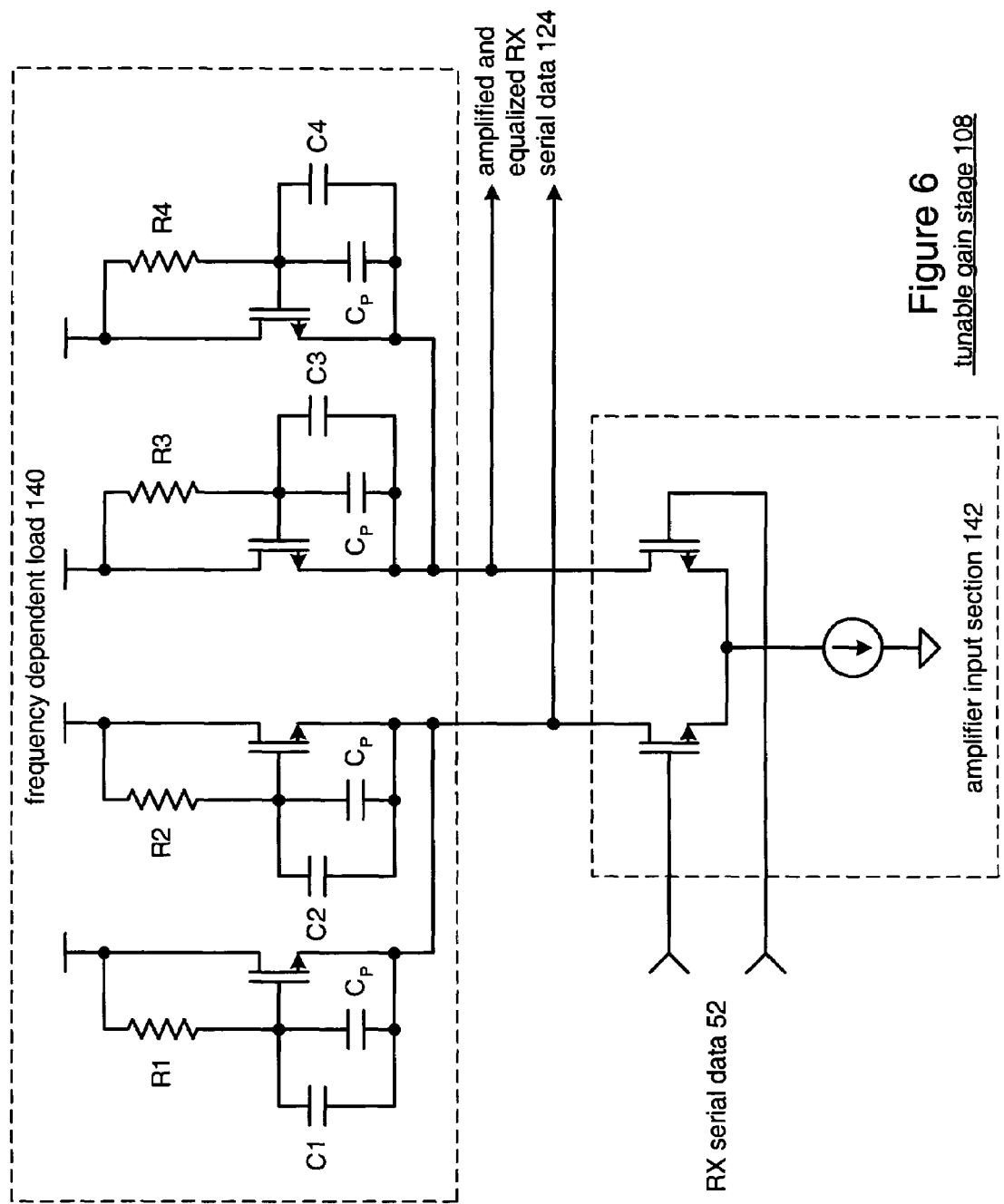
FIGS. 6 and 6A are schematic block diagrams of various embodiments of a tunable gain stage in accordance with the present invention.

FIG. 6 is a schematic block diagram of an embodiment of the tunable gain stage 108 of FIG. 4 and/or one of the stages of the tunable gain stage of FIG. 5. In this embodiment, the frequency dependent load 140 includes a plurality of high-pass filters that are produced by the combination of NMOS transistors, resistors R1, R2, R3, R4 and capacitors C1, C2, C3 and C4. Note that capacitor having the designation $C_p$ corresponds to the parasitic capacitance of the NMOS transistors. As one of average skill in the art will appreciate, resistors R1-R4 may be adjustable such that the frequency response of the corresponding high-pass filter may be tuned in accordance with the equalization setting. Further, the high-pass filter formed by R1, $C_p$, and C1 may be selectively enabled or disabled to further adjust the overall transfer characteristic of the frequency dependent load 140. Similarly, R4, $C_p$, and C4 may be enabled or disabled to adjust the overall transfer characteristic of the frequency dependent load 140. As one of average skill in the art will further appreciate, capacitors C1, C2, C3 and C4 may be omitted depending on the size of the parasitic capacitance $C_p$ and the desired corner frequency or frequencies of the high-pass filter or filters.

The amplifier input section 142 includes a pair of NMOS input transistors that receive the received serial data 52 and are coupled to a current source. As such, the frequency dependent load 140 acts as the load for amplifier input section 142. Since the frequency dependent load 140 includes the high-pass filtering established by resistors R1-R4, capacitors C1-C4, and parasitic capacitance, the amplification of the signal also includes a filtering, or equalization, of the signal, which results in the amplified and equalized received serial data 124.

Figure 6A:
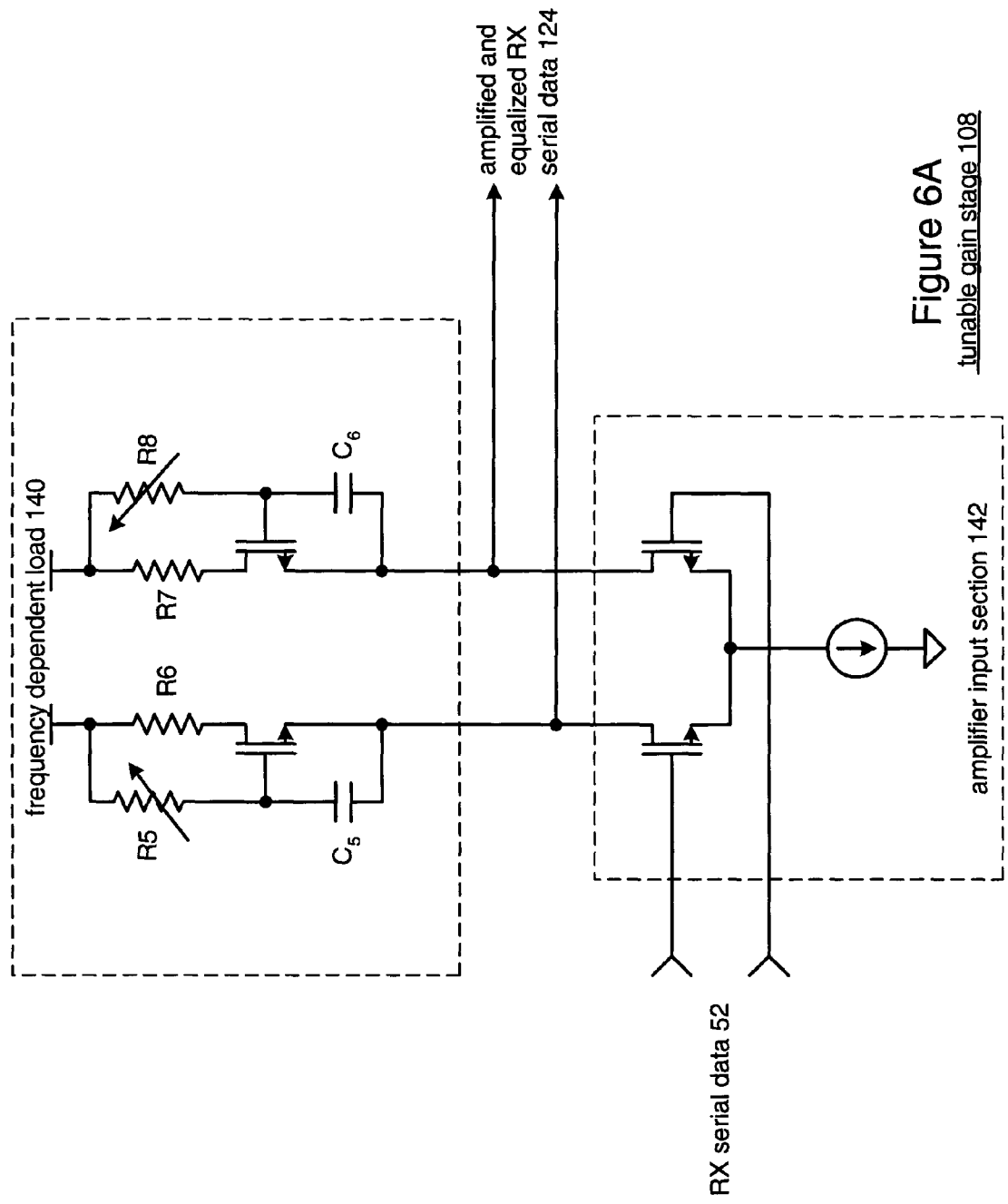

FIG. 6A is a schematic block diagram of another embodiment of the tunable gain stage 108 of FIG. 4 and/or one of the stages of the tunable gain stage of FIG. 5. In this embodiment, the frequency dependent load 140 includes a plurality of high-pass filters that are produced by the combination of NMOS transistors, resistors R5, R6, R7, R8 and capacitors C5 and C6. As shown, resistors R5 and R8 are variable resistors that are adjustable to tune the corresponding RC high pass filter (i.e., the high pass filter produced by the resistor, e.g., R5 (or R8) and the associated capacitor, e.g., C5 (or C6)) to obtain the desired corner frequency. Further, resistors R6 and R7 provide loading for the amplifier such that the output impedance, voltage levels, and/or power levels of the gain stage are at desired values. In yet another embodiment, C5 and C6 are the parasitic capacitances of their associated transistors.

The amplifier input section 142 includes a pair of NMOS input transistors that receive the received serial data 52 and are coupled to a current source. As such, the frequency dependent load 140 acts as the load for amplifier input section 142. Since the frequency dependent load 140 includes the high-pass filtering established by resistors R5 and R8 and the capacitors C5 and C6, the amplification of the signal also includes a filtering, or equalization, of the signal, which results in the amplified and equalized received serial data 124.

Figure 7:
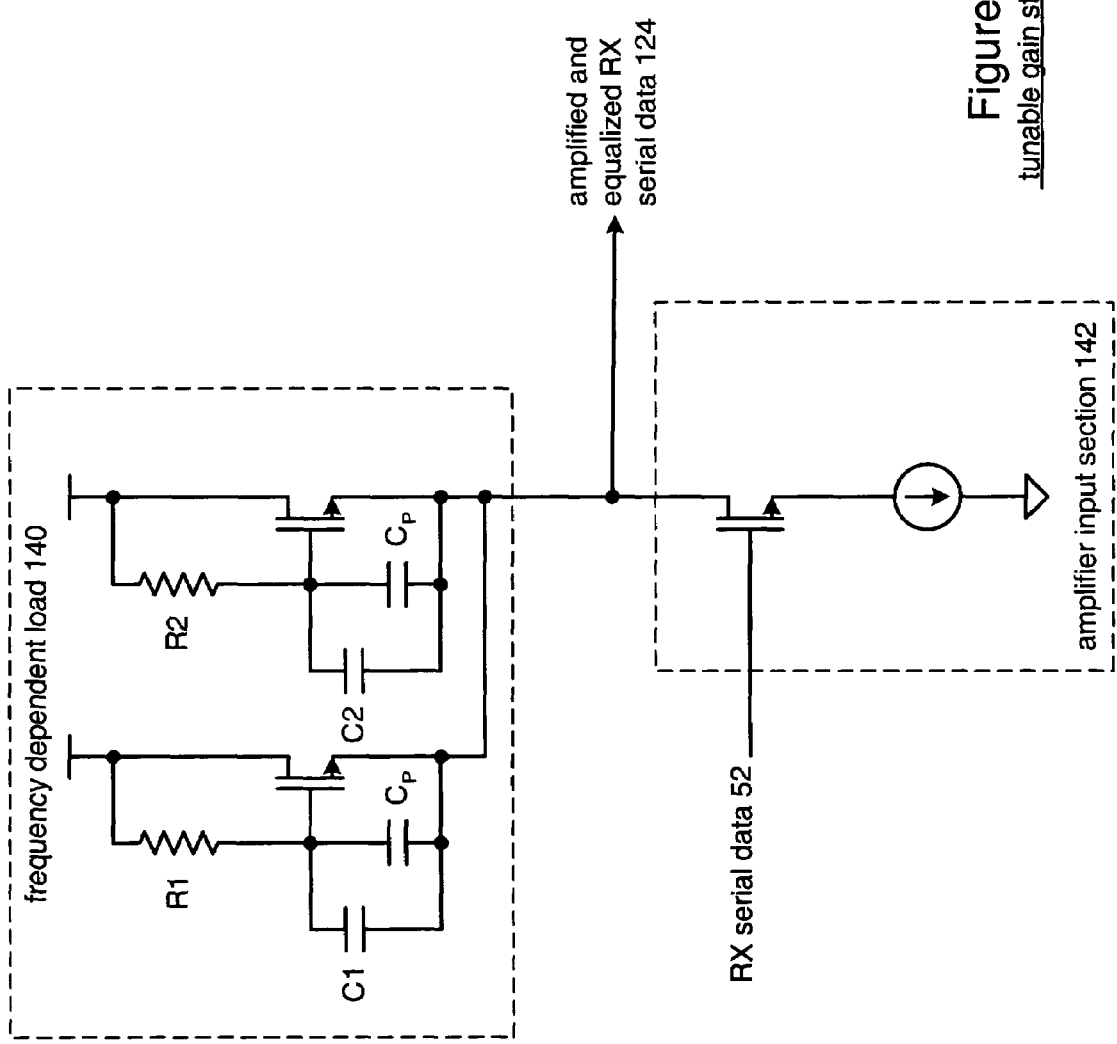
FIG. 7 is a schematic block diagram of an alternate embodiment of a tunable gain stage in accordance with the present invention.

FIG. 7 is a schematic block diagram of a single-ended signaling tunable gain stage 108 or one of the stages of the tunable gain stage of FIG. 5. In this embodiment, the frequency dependent load 140 includes resistors R1 and R2, capacitors C1 and C2, NMOS transistors and its corresponding parasitic capacitance ($C_p$). The amplifier input section 142 includes an input transistor and current source. In combination, the amplifier input section 142 and frequency dependent load amplifies and equalizes the received serial data 152 to produce the amplified and equalized received serial data 124.

As one of average skill in the art will appreciate, the frequency dependent load 140 shown in FIGS. 6 and/or 7 may include more or less resistor-capacitor combinations to further fine tune the high-pass filtering, or equalization, provided by the tunable gain stage. Further, the resistors and/or capacitors may be adjustable and individually enabled to adjust the high-pass filtering, and/or equalization, provided by the tunable gain stage 108.

FIG. 8A is a schematic block diagram of a channel between two programmable logic devices 10. As shown, the channel includes a transmission line (TX line), a connector, a $2^{nd}$ transmission line, a $2^{nd}$ connector and a $3^{rd}$ transmission line. This configuration is typical for integrated circuits mounted on different printed circuit boards where the printed circuit boards are coupled via a backplane. In this configuration, the integrated circuits may be up to a meter apart. At this distance, for high-speed serial data, the channel response will be significant and require appropriate equalization.

FIG. 8B illustrates a channel that includes a single transmission line between programmable logic devices 10 that may be on the same printed circuit board. In this example, the length of the channel is much shorted than that of FIG. 8A. As such, its channel response will have less adverse affects on high-speed data than the channel of FIG. 8A.

FIG. 8C illustrates the channel response for the channels of FIGS. 8A and 8B. As shown, the channel for FIG. 8A has a corner frequency that occurs at a frequency lower than the channel response for the channel of FIG. 8B. In addition, the attenuation rate may be greater for the channel of FIG. 8A than for FIG. 8B. In addition, FIG. 8C illustrates the data transmission rates that may traverse the channels of FIGS. 8A and 8B. AS shown, a 3.125 gigabits-per-second transmission rate occurs at a lower frequency than 6.25 gigabits-per-second, which, in turn, is less than the 10 gigabits-per-second.

As is further shown for the 3.125 gigabits-per-second rate, the channel response for the channel of FIG. 8B has minimal effect on the data being transmitted while the channel of FIG. 8A begins to attenuate the data transmissions at the 3.125 gigabits-per-second rate. As is known, attenuation distorts the signals and thus reduces the receiver's sensitivity. As further shown, the 6.25 gigabits-per-second rate is significantly attenuated by the channel of FIG. 8A and is somewhat attenuated by the channel of FIG. 8B. The 10 gigabits-per-second rate is significantly attenuated by either channel.

FIG. 8D illustrates the programmable equalization provided by the programmable analog front-end of the present invention. As shown, the equalization for 3.125 gigabits-per-second rate may be set to compensate for the channel response of FIG. 8A or 8B. As the transmission rate increases and/or the channel response increases (i.e., the channel length increases), the amount of attenuation increases thus requiring the equalization to increase. As shown, the programmed equalization is significantly greater for 6.25 gigabits-per-second than it was for 3.125 gigabits-per-second and is even greater for 10 gigabits-per-second.

The preceding discussion has presented a programmable analog front-end that includes built-in equalization. By tuning the equalization within the analog front-end, the channel response for various channels may be more appropriately compensated thus improving the receiver sensitivity, which in turn increases the reliability of high speed data transmissions. As one of average skill in the art will appreciate, other embodiments may be derived from the teaching of the present invention without deviating from the scope of the claims.

What is claimed is:

1. An analog front-end having built-in equalization, the analog front-end comprises:
control module operably coupled to provide a frequency response setting based on a channel response of a channel providing high-speed serial data to the analog front end; and
tunable gain stage operably coupled to amplify and equalize the high-speed serial data based on the frequency response setting, wherein the tunable gain stage comprises:
a frequency dependent load that is adjusted based on the frequency response setting;
amplifier input section operably coupled to the frequency dependent load, wherein the amplifier input section receives the high-speed serial data and, in conjunction with the frequency dependent load amplifies and equalizes the high-speed serial data to produce an amplified and equalized serial data;
a first stage operably coupled to amplify and equalize, to a first level, the high-speed serial data based on the frequency response setting to produce a first amplified and equalized serial data; and
a second stage operably coupled to amplify and equalize the first amplified and equalized serial data based on the frequency response setting to produce the amplified and equalized serial data, the second stage comprising:
an input stage operably coupled to amplify and equalize the first amplified and equalized serial data based on the frequency response setting to produce intermediate amplified and equalized serial data; and
an output stage operably coupled to amplify and equalize the intermediate amplified and equalized serial data based on the frequency response setting to produce the amplified and equalized serial data.

2. The analog front-end of claim 1, wherein the frequency dependent load further comprises at least one high pass filter.

3. The analog front-end of claim 2, wherein each of the at least one high pass filter further comprises:
a transistor having a gate, a drain, and a source;
an adjustable resistor operably coupled to the gate and the drain of the transistor, wherein a resistance value of the adjustable resistor is set based on the frequency response setting, and wherein parasitic capacitance of the transistor and the adjustable resistor establish a corner frequency for the each of the at least one high pass filter.

4. The analog front-end of claim 3, wherein the each of the at least one high pass filter further comprises:
a capacitor operably coupled between the gate and source of the transistor, wherein the capacitor, the parasitic capacitance and the adjustable resistor establish the corner frequency for the each of the at least one high pass filter.

5. The analog front-end of claim 1, wherein the tunable gain stage further comprises:
the frequency dependent load including:
a transistor having a gate, a drain, and a source;
an adjustable resistor operably coupled to the gate and the drain of the transistor, wherein a resistance value of the adjustable resistor is set based on the frequency response setting;
the amplifier input section including:
an input transistor having a gate, a drain, and a source, wherein the gate of the input transistor is operably coupled to receive, as a single-ended signal, the high-speed serial data, and the drain of the input transistor is operably coupled to the source of the transistor to provide the amplified and equalized serial data; and
current source operably coupled to the source of the input transistor and to a voltage return.

6. The analog front-end of claim 1, wherein the tunable gain stage further comprises:
the frequency dependent load including:
a first transistor having a gate, a drain, and a source;
a first adjustable resistor operably coupled to the gate and the drain of the first transistor, wherein a resistance value of the first adjustable resistor is set based on the frequency response setting;
a second transistor having a gate, a drain, and a source;
a second adjustable resistor operably coupled to the gate and the drain of the second transistor, wherein a resistance value of the second adjustable resistor is set based on the frequency response setting;
the amplifier input section including:
a first input transistor having a gate, a drain, and a source, wherein the gate of the first input transistor is operably coupled to receive, as one leg of a differential signal, the high-speed serial data, and the drain of the first input transistor is operably coupled to the source of the first transistor to provide one leg of the amplified and equalized serial data;
a second input transistor having a gate, a drain, and a source, wherein the gate of the second input transistor is operably coupled to receive, as another leg of a differential signal, the high-speed serial data, and the drain of the second input transistor is operably coupled to the source of the second transistor to provide another leg of the amplified and equalized serial data;
current source operably coupled to the sources of the first and second input transistors and to a voltage return.

7. A high-speed data receiver comprises:
an analog front-end operably coupled to amplify and equalize high-speed data to produce amplified and equalized high-speed data; and
a clock and data recovery module operably coupled to recover a clock signal and data from the amplified and equalized high-speed data, wherein the analog front-end includes:
a control module operably coupled to provide a frequency response setting based on a channel response of a channel providing the high-speed data to the analog front end; and
a tunable gain stage operably coupled to amplify and equalize the high-speed data based on the frequency response setting, wherein the tunable gain stage includes:
a frequency dependent load that is adjusted based on the frequency response setting and comprises at least one high pass filter, the at least one high pass filter comprising:
a transistor having a gate, a drain, and a source; and
an adjustable resistor operably coupled to the gate and the drain of the transistor, wherein a resistance value of the adjustable resistor is set based on the frequency response setting, and wherein parasitic capacitance of the transistor and the adjustable resistor establish a corner frequency for the each of the at least one high pass filter; and
an amplifier input section operably coupled to the frequency dependent load, wherein the amplifier input section receives the high-speed data and, in conjunction with the frequency dependent load amplifies and equalizes the high-speed data to produce an amplified and equalized serial data.

8. The high-speed data receiver of claim 7, wherein the tunable gain stage further comprises:
   a first stage operably coupled to amplify and equalize, to a first level, the high-speed data based on the frequency response setting to produce a first amplified and equalized serial data; and
   a second stage operably coupled to amplify and equalize the first amplified and equalized serial data based on the frequency response setting to produce the amplified and equalized serial data.

9. The high-speed data receiver of claim 8, wherein the second stage further comprises:
   an input stage operably coupled to amplify and equalize the first amplified and equalized serial data based on the frequency response setting to produce intermediate amplified and equalized serial data; and
   an output stage operably coupled to amplify and equalize the intermediate amplified and equalized serial data based on the frequency response setting to produce the amplified and equalized serial data.

10. The high-speed data receiver of claim 7, wherein the each of the at least one high pass filter further comprises:
    a capacitor operably coupled between the gate and source of the transistor, wherein the capacitor, the parasitic capacitance and the adjustable resistor establish the corner frequency for the each of the at least one high pass filter.

11. The high-speed data receiver of claim 7, wherein the tunable gain stage further comprises:
    the frequency dependent load including:
       a transistor having a gate, a drain, and a source;
       an adjustable resistor operably coupled to the gate and the drain of the transistor, wherein a resistance value of the adjustable resistor is set based on the frequency response setting;
    the amplifier input section including:
       an input transistor having a gate, a drain, and a source, wherein the gate of the input transistor is operably coupled to receive, as a single-ended signal, the high-speed data, and the drain of the input transistor is operably coupled to the source of the transistor to provide the amplified and equalized serial data; and
       current source operably coupled to the source of the input transistor and to a voltage return.

12. The high-speed data receiver of claim 7, wherein the tunable gain stage further comprises:
    the frequency dependent load including:
       a first transistor having a gate, a drain, and a source;
       a first adjustable resistor operably coupled to the gate and the drain of the first transistor, wherein a resistance value of the first adjustable resistor is set based on the frequency response setting;
       a second transistor having a gate, a drain, and a source;
       a second adjustable resistor operably coupled to the gate and the drain of the second transistor, wherein a resistance value of the second adjustable resistor is set based on the frequency response setting;
    the amplifier input section including:
       a first input transistor having a gate, a drain, and a source, wherein the gate of the first input transistor is operably coupled to receive, as one leg of a differential signal, the high-speed data, and the drain of the first input transistor is operably coupled to the source of the first transistor to provide one leg of the amplified and equalized serial data;
       a second input transistor having a gate, a drain, and a source, wherein the gate of the second input transistor is operably coupled to receive, as another leg of a differential signal, the high-speed data, and the drain of the second input transistor is operably coupled to the source of the second transistor to provide another leg of the amplified and equalized serial data;
       current source operably coupled to the sources of the first and second input transistors and to a voltage return.

* * * * *